(12) United States Patent
Benderly

(10) Patent No.: US 10,893,727 B2
(45) Date of Patent: Jan. 19, 2021

(54) FACETED GEMSTONE WITH ENHANCED COLOR DISPERSION AND DIMINISHED HAZE

(71) Applicant: Diffraction Grating Services, LLC, Teaneck, NJ (US)

(72) Inventor: David Benderly, Edgewater, NJ (US)

(73) Assignee: Diffraction Grating Services LLC, Teaneck, NJ (US)

( * ) Notice: Subject to any disclaimer, the term of this patent is extended or adjusted under 35 U.S.C. 154(b) by 37 days.

(21) Appl. No.: 16/112,870

(22) Filed: Aug. 27, 2018

(65) Prior Publication Data

US 2020/0060394 A1 Feb. 27, 2020

(51) Int. Cl.
*A44C 17/00* (2006.01)
*G02B 5/18* (2006.01)

(52) U.S. Cl.
CPC .......... *A44C 17/001* (2013.01); *G02B 5/1857* (2013.01)

(58) Field of Classification Search
CPC ............................. A44C 17/001; G02B 5/1857
See application file for complete search history.

(56) References Cited

U.S. PATENT DOCUMENTS

| | | | |
|---|---|---|---|
| 484,934 A | 10/1892 | Jacobson | |
| 5,612,102 A | 3/1997 | Nakama | |
| 8,033,136 B2 | 10/2011 | Maltezos | |
| 8,069,688 B2 | 12/2011 | Maltezos | |
| 8,314,989 B1 | 11/2012 | Mossberg | |
| 8,479,538 B2 | 7/2013 | Maltezos | |
| D699,145 S | 2/2014 | Gudslewski | |
| D699,618 S | 2/2014 | Gudslewski | |
| 2007/0157667 A1 | 7/2007 | Maltezos | |
| 2015/0101365 A1 | 4/2015 | Hui | |
| 2019/0037980 A1 | 2/2019 | Maltezos | |

FOREIGN PATENT DOCUMENTS

WO 2019043570 3/2019

OTHER PUBLICATIONS

Author unknown, In Which of these Materials Does Light travel the Slowest:Diamonds, Air, or Glass?, Sciencing, paragraph 3, https://sciencing.com/materials-light-travel-slowest-diamonds-air-glass-8366.html, Apr. 24, 2017.
International Search Report in corresponding International Application No. PCT/US19/18910, dated May 8, 2019.

*Primary Examiner* — Jack W Lavinder
(74) *Attorney, Agent, or Firm* — Lerner, David, Littenberg, Krumholz & Mentlik, LLP

(57) ABSTRACT

Incident light enters a faceted gemstone and is routed along optical paths to exit the gemstone as emergent light. At least one diffraction grating is patterned on the gemstone in an asymmetrical manner relative to an axis of symmetry. The diffraction grating has a diffractive structure positioned on at least one facet for diffracting the light being routed along at least one of the optical paths to enhance color dispersion of the emergent light. The diffraction grating is the only diffraction grating to diffract the light being routed along the at least one optical path to diminish haze of the emergent light.

18 Claims, 4 Drawing Sheets

FACETED GEMSTONE WITH ENHANCED COLOR DISPERSION AND DIMINISHED HAZE

BACKGROUND OF THE INVENTION

The present disclosure relates generally to a faceted gemstone, such as a diamond, and, more particularly, to enhancing desirable optical attributes of the diamond, for example, color dispersion or fire, by patterning one or more diffraction gratings on facets of the diamond, while simultaneously diminishing undesirable optical attributes, such as haze, which is characterized by a milky, opalescent, cloudy appearance for the diamond.

It is known to cut and polish a diamond to maximize capture of incident light and to enhance desirable optical attributes of the diamond, such as brilliance or brightness of emergent light exiting the diamond, fire or color dispersion of the emergent light, contrast between dark and white areas within the diamond, and scintillation or sparkle. It is also known to pattern, e.g., etch, diffraction gratings in a symmetrical arrangement relative to a main axis of symmetry of the diamond, in symmetrically arranged facets of the diamond in order to enhance its color dispersion. However, as advantageous as the use of such symmetrically arranged diffraction gratings has been, interference of the captured light passing between, and diffracted by, the diffraction gratings causes an undesirable haze, i.e., a milky, opalescent, cloudy appearance, for the diamond, thereby significantly decreasing its beauty and value.

Accordingly, there is a need for patterning one or more diffraction gratings on the facets of the diamond in a manner that diminishes, and preferably, substantially eliminates, such haze.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
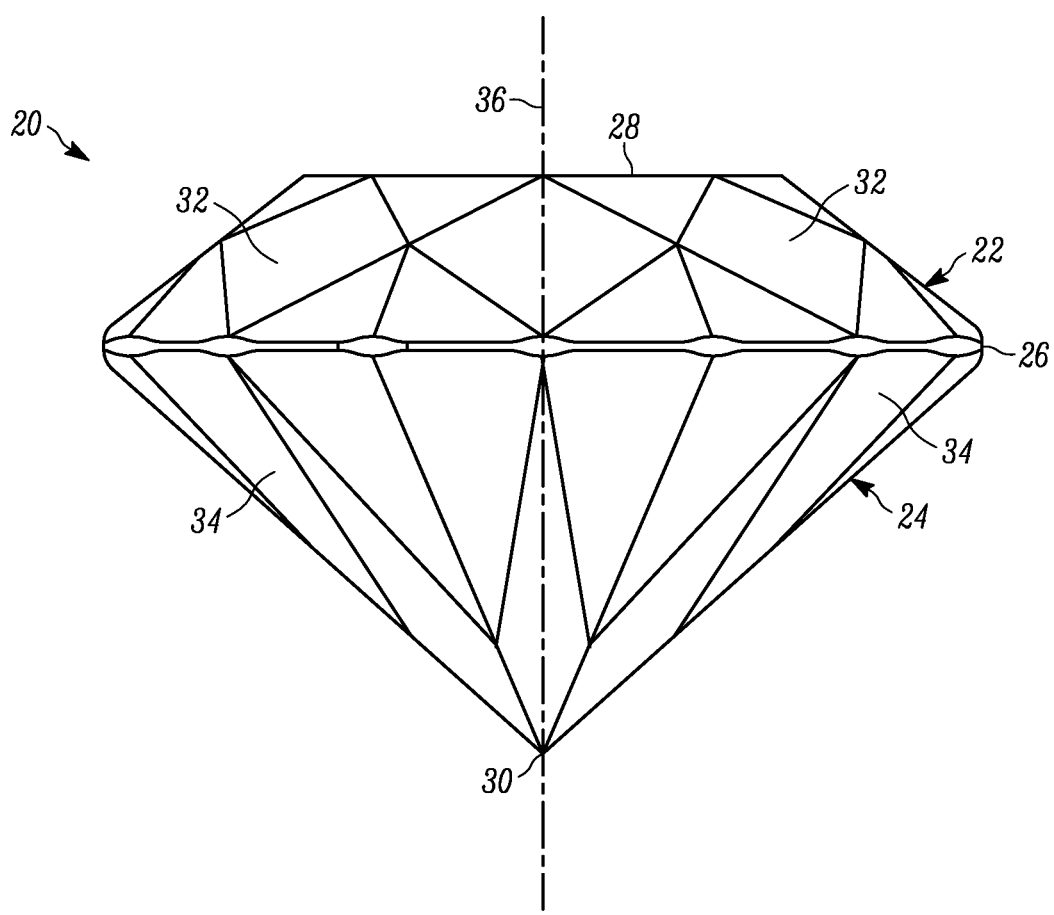
FIG. 1 is a side elevation view of a known faceted gemstone, such as a round brilliant cut diamond.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The components of the faceted gemstone have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One aspect of the present disclosure relates to a gemstone, such as a diamond, constituted of a light-transmissive material and having a refractive index greater than air, an axis of symmetry, and a plurality of cut facets on which incident light entering the material is routed along optical paths through the material to exit the material as emergent light. At least one diffraction grating is located on the material in an asymmetrical manner relative to the axis. This diffraction grating has a diffractive structure patterned on, e.g., etched in, at least one of the facets for diffracting the light being routed along at least one of the optical paths to enhance color dispersion of the emergent light. This diffraction grating is the only diffraction grating to diffract the light being routed along the at least one optical path.

In accordance with a preferred embodiment, this diffraction grating is located on the material at one side of the axis. The opposite side of the axis, which is located at a mirror image location relative to the one side along the optical path, has no diffraction grating patterned on the material.

The asymmetrical placement of this diffraction grating minimizes any haze or milky, opalescent, cloudy appearance for the gemstone. The light being routed through the gemstone is diffracted by a single diffraction grating, because it is the only diffraction grating along the optical path, thereby avoiding any light interference between successive diffraction gratings along the optical path. The beauty and value of the gemstone are preserved. Another aspect of the present disclosure relates to a method of diminishing such haze.

Turning now to FIG. 1 of the drawings, reference numeral 20 generally identifies a faceted gemstone, and, in particular, a round brilliant cut diamond. Although the invention is described and illustrated with a round brilliant cut diamond, it will be understood that different cuts, such as princess, marquise, baguette, heart, briolette, oval, and pear cuts, may be used. Also, the gemstone need not be a diamond, but can be any ornament of a light-transmissive, natural or synthetic, material and having an index of refraction greater than air. For example, this includes any precious or semi-precious stone, and even cubic zirconium.

As best shown in FIG. 1, the diamond 20 has an upper frustoconical portion or crown 22, a lower conical portion or pavilion 24, and a circular girdle 26 between the crown 22 and the pavilion 24. The crown 22 has a flat top or table 28, and the pavilion 24 tapers to a pointed end or culet 30. The crown 22 is cut with crown facets 32, and the pavilion 24 is cut with pavilion facets 34. Each facet 32, 34 is a planar surface. The diamond 20 has a vertical axis of symmetry 36 about which the crown facets 32 and the pavilion facets 34 are inclined and symmetrically arranged. The axis 36 extends through the culet 30 and is perpendicular to the table 28. The diamond 20 is constituted of a light-transmissive material and has a refractive index greater than air, typically about 2.417. For this refractive index, the critical angle for any planar surface of the diamond to reflect light by total internal reflection is about 24.44 degrees.

Figure 2:
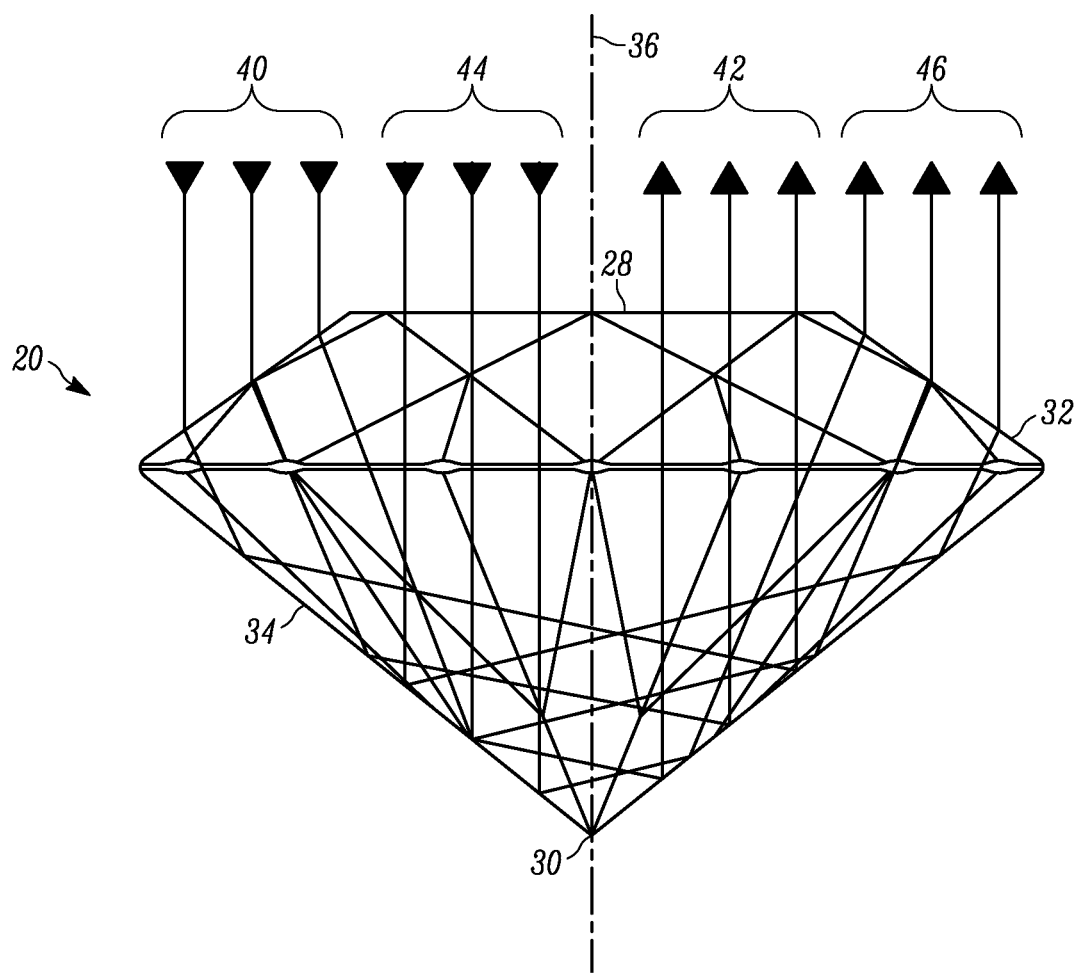
FIG. 2 is a schematic representation of optical paths of light entering, passing through, and exiting the known diamond of FIG. 1.

As best shown in FIG. 2, incident light entering the diamond 20 is routed along optical paths through the diamond 20 to exit the diamond 20 as emergent light. More particularly, representative light rays 40 incident on the crown facets 32 are refracted downwardly to the pavilion facets 34 at one side of the axis 36, and then reflected across to the pavilion facets 34 at the opposite side of the axis 36, and then reflected upwardly to and through the table 28 to exit as light rays 42. In addition, representative light rays 44 incident on the table 28 are routed downwardly to the pavilion facets 34 at one side of the axis 36, and then reflected across to the pavilion facets 34 at the opposite side of the axis 36, and then reflected upwardly to and through the crown facets 32 to exit as light rays 46. The pavilion facets 34 are inclined at less than the aforementioned critical angle of the diamond so that they reflect the light incident thereon by total internal reflection.

Figure 3:
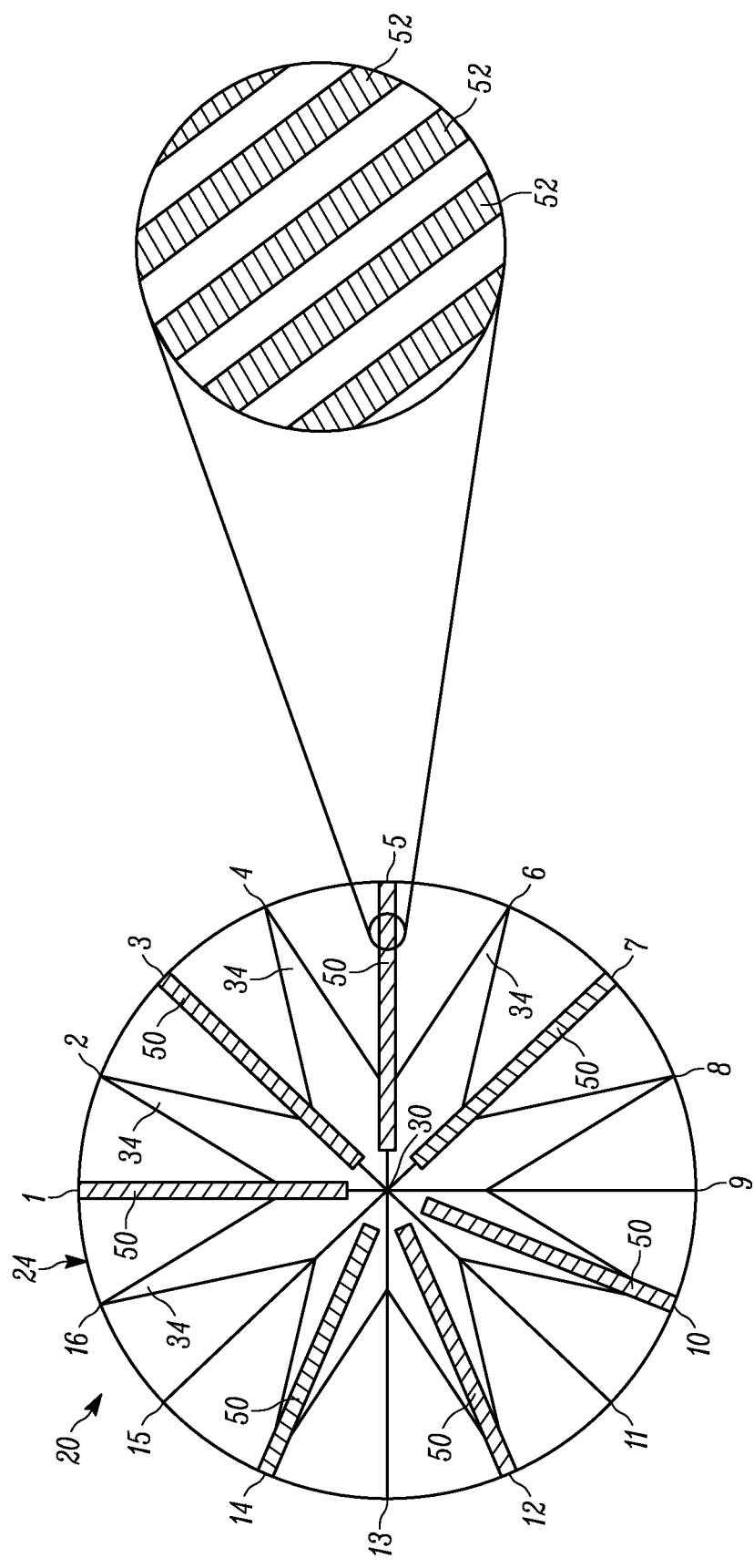
FIG. 3 is a bottom plan view of the diamond of FIG. 1 in accordance with one embodiment of diffraction gratings asymmetrically arranged thereon, as well as an enlarged depiction of part of one of the gratings to show its periodic diffractive features.

In accordance with the embodiment of FIG. 3, a plurality of diffraction gratings 50 is patterned and located on the pavilion 24 in an asymmetrical manner relative to the axis 36. For ease of explanation, numerals 1-16 identify different angular positions on the pavilion 24, as seen in bottom plan view, around the axis 36. Thus, diffraction gratings 50 are shown, by way of non-limiting example, as only being located at positions 1, 3, 5, 7, 10, 12 and 14. Each diffraction grating 50 has a periodic, quasi-periodic, or non-periodic, diffractive structure positioned on certain of the pavilion facets 34 for diffracting the light being routed along each optical path to enhance color dispersion of the emergent light. As explained in detail below, each diffraction grating 50 is the only diffraction grating to diffract the light being routed along each optical path in order to diminish haze in the emergent light.

Each diffraction grating 50 is located on the pavilion 24 at one side of the axis 36, and an opposite side of the axis 36, which is located at a mirror image location relative to the one side along the optical path, has no diffraction grating on the pavilion 24. Thus, the grating 50 at position 1 has no grating 50 at its mirror image position 9; the grating 50 at position 3 has no grating 50 at its mirror image position 11; the grating 50 at position 5 has no grating 50 at its mirror image position 13; the grating 50 at position 7 has no grating 50 at its mirror image position 15; the grating 50 at position 10 has no grating 50 at its mirror image position 2; the grating 50 at position 12 has no grating 50 at its mirror image position 4; and the grating 50 at position 14 has no grating 50 at its mirror image position 6. Since each optical path has only one grating 50, there is little, or no, light interference between successive gratings, and thus, the asymmetrical distribution of the gratings 50 diminishes and reduces any haze in the diamond's appearance, and preserves the beauty and value of the diamond 20, in accordance with the method of this disclosure.

Although the embodiment of FIG. 3 has seven gratings 50, a different number of gratings, including just one grating, can be used. An even or an odd number of gratings may be employed. The gratings 50 are not equiangularly arranged about the axis 36. The gratings 50 could also be located on the crown facets 32. Each grating 50 may be deposited on, or etched in, part of a single facet, or on or in one or more facets.

Figure 4:
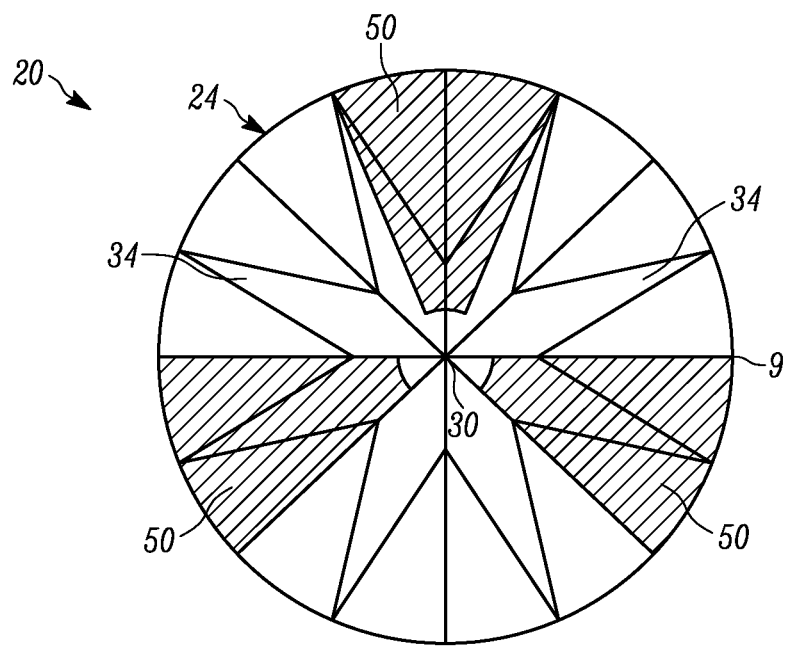
FIG. 4 is a bottom plan view of the diamond of FIG. 1 in accordance with another embodiment of diffraction gratings asymmetrically arranged thereon.

Turning to the embodiment of FIG. 4, three gratings 50 are shown, and each grating 50 covers more than one pavilion facet 34. Again, the gratings 50 are asymmetrically arranged about the axis 36. Each diffraction grating 50 is located on the pavilion 24 at one side of the axis 36, and an opposite side of the axis 36, which is located at a mirror image location relative to the one side, has no diffraction grating on the pavilion 24.

Figure 5:
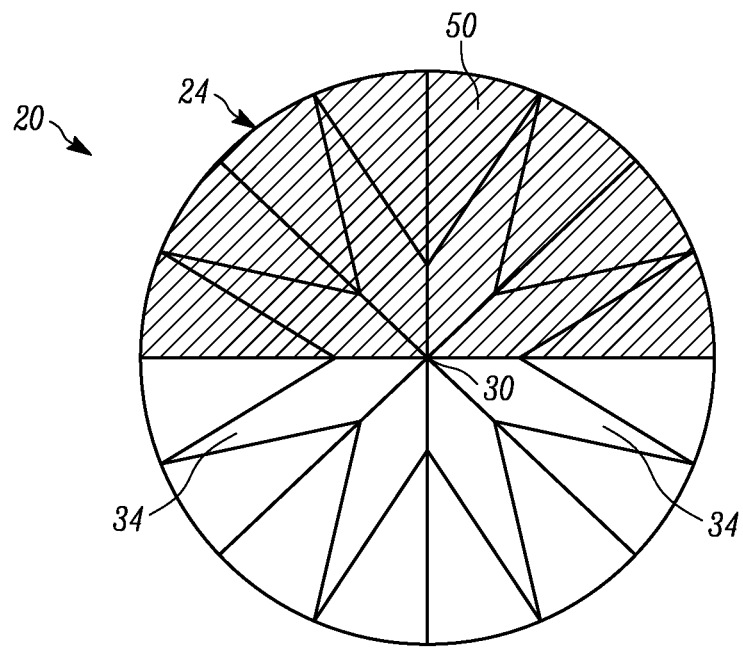
FIG. 5 is a bottom plan view of the diamond of FIG. 1 in accordance with still another embodiment of diffraction gratings asymmetrically arranged thereon.

Turning to the embodiment of FIG. 5, a single grating 50 is shown, and the grating 50 covers the pavilion facets 34 over half of the pavilion 24. There is no grating at the opposite mirror image side of the pavilion. Again, the grating 50 is asymmetrically arranged about the axis 36.

As best shown in the enlarged circular detail of FIG. 3, each diffraction grating 50 has a plurality of individual diffractive structures or features 52, such as grooves, indentations, protrusions, reflective or absorbent markings, and the like, or any combination thereof. These diffractive features 52 may be patterned at, e.g., deposited on, or etched in, the exterior surface of the diamond. These diffractive features 52 may be periodic, quasi-periodic, or non-periodic. In a preferred embodiment, periodic grooves are etched into the diamond, and the grooves extend in mutual parallelism. The depth of each groove, in the preferred embodiment, lies in the range from 20 nm to 100 nm, thereby rendering the grating 50 substantially invisible. These features 52 scatter and diffract light, and may modulate the amplitude or shift the phase of the light.

Each diffraction grating 50 is preferably etched as follows. First, the diamond surface is cleaned to remove any impurities and promote mask adhesion. Next, a hard mask is deposited. There are several methods used to deposit hard masks. As an example, a hard mask could be deposited by plasma-enhanced chemical vapor deposition (PECVD). The thickness of the mask is determined by the mask-diamond relative etch rate (selectivity) and the desired depth of the diamond etching. Next, a soft mask or photoresist layer is deposited on top of the hard mask. This photoresist layer is commonly deposited by a spin coat or spray coating process. There are two main types of photoresist masks: positive and negative. In a negative photoresist mask, the portion of the photoresist layer that is exposed to light becomes insoluble to a developer. The unexposed portion of the photoresist layer is dissolved by the developer.

A soft dehydration bake step is next employed to drive off solvents and to solidify and stabilize the photoresist layer. The photoresist layer is sensitive to ultraviolet (UV light), typically in the 350-450 nm range. The photoresist layer is selectively exposed with the desired diffraction grating pattern. The correct exposure time and energy density at the surface is carefully controlled to assure correct dosage. In a post exposure bake (PEB) step, an additional photoresist bake takes place. This helps to further dehydrate the photoresist layer and also will smooth any wavy features caused by standing waves.

Next, in a development step, the develop process could be a simple immersion of the patterned diamond in a bath of developer solution or done with an automated computer-controlled spray/puddle program on a centrifugal rotating platform to assure a greater consistency. When the areas exposed to the UV energy develop away, the photoresist layer is considered being a positive tone. If the exposed areas remain after development, then the photoresist layer is considered being a negative tone. After development, the hard mask is selectively exposed based on the diffraction grating pattern projected. This layer of hard mask is then removed in a wet or dry process, such as reactive ion etching (RIE) using a gas mixture that will promote the hard mask physical and chemical etching.

Similar to the previous etching, a reactive ion etching (RIE) or inductive-coupled plasma (ICP-RIE) etching cycle is used to etch the exposed portion of the diamond. The hard mask pattern protects the diamond surface during this etching cycle. Once the diamond etching depth is achieved, the remaining mask is then removed, usually by a chemical process. After cleaning, the diffraction grating-patterned diamonds are left without any of the temporary layers and masks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus, the following claims are hereby incorporated into the Detailed Description, with each claim standing on its own as a separately claimed subject matter.

The invention claimed is:

1. A gemstone constituted of a light-transmissive material having a refractive index greater than air, an axis of symmetry, and a plurality of cut facets on which incident light entering the material is routed along optical paths through the material to exit the material as emergent light, the cut facets being symmetrically arranged adjacent one another about, and inclined relative to, the axis to reflect the light incident thereon by total internal reflection, the gemstone comprising:
   a diffraction grating patterned on the material in an asymmetrical manner relative to the axis of symmetry, the diffraction grating having a diffractive structure positioned on a plurality of adjacent ones of the cut facets for diffracting the light being routed along at least one of the optical paths to enhance color dispersion of the emergent light, and the diffraction grating being the only diffraction grating to diffract the light being routed along the at least one optical path to diminish haze of the emergent light.

2. The gemstone of claim 1, wherein the material has an upper faceted portion and a lower faceted portion; and wherein the cut facets are symmetrically arranged about the axis of symmetry on the lower faceted portion.

3. The gemstone of claim 1, wherein the diffraction grating has periodic diffractive features.

4. The gemstone of claim 1, wherein the adjacent ones of the cut facets are grouped in a first group at one side of the axis, and in a second group at an opposite side of the axis; and wherein the asymmetrical diffraction grating is positioned in only one of said groups.

5. A gemstone constituted of a light-transmissive material having a refractive index greater than air, an axis of symmetry, and a plurality of cut facets on which incident light entering the material is routed along optical paths through the material to exit the material as emergent light, the cut facets being symmetrically arranged about, and inclined relative to, the axis to reflect the light incident thereon by total internal reflection, the gemstone comprising:
   a plurality of diffraction gratings patterned on the material in an asymmetrical manner relative to the axis of symmetry, each diffraction grating having a diffractive structure positioned at the facets for diffracting the light being routed along each optical path to enhance color dispersion of the emergent light, each diffraction grating being the only diffraction grating to diffract the light being routed along each optical path to diminish haze of the emergent light.

6. The gemstone of claim 5, wherein each diffraction grating is etched in a plurality of facets.

7. The gemstone of claim 5, wherein there is an odd number of diffraction gratings.

8. The gemstone of claim 5, wherein at least one of the diffraction gratings has periodic diffractive features.

9. The gemstone of claim 5, wherein the diffraction gratings are angularly spaced apart around the axis of symmetry at unequal spacings.

10. The gemstone of claim 5, wherein each diffraction grating is located on the material at one side of the axis of symmetry, and an opposite side of the axis of symmetry, which is located at a mirror image location relative to the one side, has no diffraction grating on the material.

11. A method of reducing haze in a gemstone constituted of a light-transmissive material having a refractive index greater than air, an axis of symmetry, and a plurality of out facets on which incident light entering the material is routed along optical paths through the material to exit the material as emergent light, the cut facets being symmetrically arranged about, and inclined relative to, the axis to reflect the light incident thereon by total internal reflection, the method comprising:

patterning a plurality of diffraction gratings on the material in an asymmetrical manner relative to the axis of symmetry;

positioning each diffraction grating with a diffractive structure at the facets for diffracting the light being routed along each optical path to enhance color dispersion of the emergent light; and arranging each diffraction grating as the only diffraction grating to diffract the light being routed along each optical path to diminish haze of the emergent light.

12. The method of claim 11, and etching each diffraction grating in a plurality of facets.

13. The method of claim 11, and configuring at least one of the diffraction gratings with periodic diffractive features.

14. The method of claim 11, and locating each diffraction grating on the material at one side of the axis of symmetry, and locating no diffraction grating on the material at an opposite side of the axis of symmetry that is located at a mirror image location relative to the one side.

15. A gemstone constituted of a light-transmissive material having a refractive index greater than air, an axis of symmetry, and a plurality of cut facets on which incident light entering the material is routed along optical paths through the material to exit the material as emergent light, the gemstone comprising:

a plurality of diffraction gratings patterned on the material in an asymmetrical manner relative to the axis of symmetry, each diffraction grating having a diffractive structure positioned at the facets for diffracting the light being routed along each optical path to enhance color dispersion of the emergent light, each diffraction grating being the only diffraction grating to diffract the light being routed along each optical path to diminish haze of the emergent light.

16. The gemstone of claim 15, wherein each diffraction grating is etched in a plurality of the facets.

17. The gemstone of claim 15, wherein each diffraction grating is located on the material at one side of the axis of symmetry; and wherein an opposite side of the axis of symmetry, which is located at a mirror image location relative to the one side, has no diffraction grating on the material.

18. The gemstone of claim 15, wherein there is an odd number of diffraction gratings.

\* \* \* \* \*